United States Patent
Loclair et al.

(10) Patent No.: US 11,995,787 B2
(45) Date of Patent: May 28, 2024

(54) SYSTEMS AND METHODS FOR THE INTERACTIVE RENDERING OF A VIRTUAL ENVIRONMENT ON A USER DEVICE WITH LIMITED COMPUTATIONAL CAPACITY

(71) Applicant: Journee Technologies GmbH, Berlin (DE)

(72) Inventors: Christian Holger Loclair, Berlin (DE); Thomas Johann Lorenz, Berlin (DE)

(73) Assignee: JOURNEE TECHNOLOGIES GmbH, Berlin (DE)

( * ) Notice: Subject to any disclaimer, the term of this patent is extended or adjusted under 35 U.S.C. 154(b) by 0 days.

(21) Appl. No.: 18/106,596

(22) Filed: Feb. 7, 2023

(65) Prior Publication Data

US 2024/0013495 A1   Jan. 11, 2024

(51) Int. Cl.
| | | |
|---|---|---|
| G06T 19/20 | (2011.01) | |
| G06T 13/40 | (2011.01) | |
| G06V 20/40 | (2022.01) | |
| H04N 5/265 | (2006.01) | |

(52) U.S. Cl.
CPC .............. *G06T 19/20* (2013.01); *G06T 13/40* (2013.01); *G06V 20/44* (2022.01); *H04N 5/265* (2013.01); *G06T 2219/024* (2013.01); *G06T 2219/2004* (2013.01)

(58) Field of Classification Search
CPC ... G06T 19/20; G06T 13/40; G06T 2219/024; G06T 2219/2004; G06V 20/44; H04N 5/265
See application file for complete search history.

(56) References Cited

U.S. PATENT DOCUMENTS

| | | | | |
|---|---|---|---|---|
| 6,271,843 B1* | 8/2001 | Lection | ................... | G06T 15/00 715/848 |
| 8,375,397 B1* | 2/2013 | Mendes da Costa | ........................ | H04N 21/4788 719/310 |
| 8,595,299 B1* | 11/2013 | Wang | ................... | H04N 21/658 463/31 |
| 8,732,591 B1* | 5/2014 | Mendes Da Costa | ........................ | G06F 40/169 707/706 |
| 11,471,775 B2* | 10/2022 | Benzies | ................... | A63F 13/53 |

(Continued)

OTHER PUBLICATIONS

The Combined Search and Examination Report, mailed on Jan. 18, 2024, in the related British Appl. No. 2310181.9.

*Primary Examiner* — YuJang Tswei

(57) ABSTRACT

A user device for rendering images of a virtual environment includes display. A browser application to establish a connection to a server for receiving streaming image data to render views of a virtual environment as a first layer of a display. Control commands initiated by a user on the user device are transmitted to the server. In response, the user device receives updated streaming image data for updating the displayed first layer. Upon detecting an occurrence of a predetermined event related to the virtual world/control commands, the user device transmits a request with a corresponding event identifier to a content management system (CMS), wherein the browser application and CMS maintain corresponding lists of event identifiers. The CMS then transmits to the user device additional display information external to the virtual environment, which the user device renders as a second partially-transparent layer overlaying the first layer.

20 Claims, 13 Drawing Sheets

(56) References Cited

U.S. PATENT DOCUMENTS

| | | | | |
|---|---|---|---|---|
| 2008/0303811 | A1* | 12/2008 | Van Luchene | A63F 13/12 |
| | | | | 345/419 |
| 2009/0106347 | A1 | 4/2009 | Harwood et al. | |
| 2009/0125481 | A1* | 5/2009 | Mendes da Costa | G06F 16/50 |
| | | | | 707/E17.061 |
| 2010/0146085 | A1* | 6/2010 | Van Wie | H04L 12/00 |
| | | | | 709/224 |
| 2010/0169837 | A1 | 7/2010 | Hyndman | |
| 2012/0050286 | A1* | 3/2012 | Yockey | A63F 13/55 |
| | | | | 345/420 |
| 2013/0135344 | A1* | 5/2013 | Stirbu | G06F 16/972 |
| | | | | 345/629 |
| 2013/0246513 | A1* | 9/2013 | Zaveri | G06F 3/067 |
| | | | | 709/203 |
| 2014/0344806 | A1* | 11/2014 | Suresh | G06F 9/45533 |
| | | | | 718/1 |
| 2018/0190003 | A1 | 7/2018 | Upadhyay et al. | |
| 2018/0336069 | A1* | 11/2018 | Soni | G06T 19/006 |
| 2019/0158630 | A1* | 5/2019 | Aragón | H04L 67/1001 |
| 2019/0208031 | A1* | 7/2019 | Bennet | G06F 9/45529 |
| 2020/0150849 | A1* | 5/2020 | Arena | G06T 15/10 |
| 2021/0233279 | A1* | 7/2021 | Dixit | H04N 19/164 |
| 2022/0060558 | A1* | 2/2022 | Bennet | H04L 67/02 |
| 2022/0108539 | A1* | 4/2022 | Nussbaum | G06Q 40/08 |
| 2022/0197675 | A1* | 6/2022 | Adler | G06F 3/0481 |
| 2022/0292543 | A1* | 9/2022 | Henderson | G06Q 30/0252 |
| 2022/0398116 | A1* | 12/2022 | Chen | G06F 9/45558 |

\* cited by examiner

| Event ID | First condition | Second condition |
|----------|-----------------|------------------|
| ID 1     |                 |                  |
|          |                 | ...              |

Fig 5a

| Event IDs | Additional Information |
|-----------|------------------------|
| ID1       | INFO1                  |
| ID2       | INFO2                  |
| ...       | ...                    |

Fig 5b

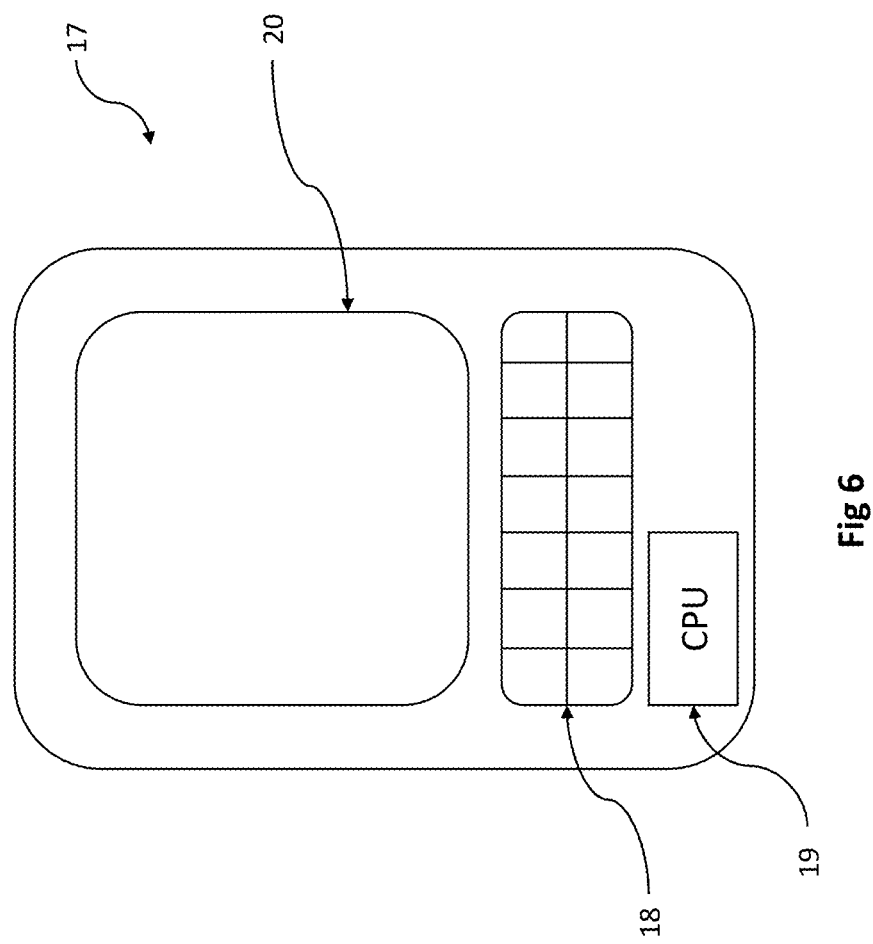

SYSTEMS AND METHODS FOR THE INTERACTIVE RENDERING OF A VIRTUAL ENVIRONMENT ON A USER DEVICE WITH LIMITED COMPUTATIONAL CAPACITY

CROSS-REFERENCE TO RELATED PATENT APPLICATIONS

This application which claims priority to Ireland Patent Application No. S2022/0111, filed Jul. 6, 2022, which is hereby incorporated by reference in its entirety herein.

FIELD OF THE INVENTION

The present Invention relates to a system, computer readable medium and a method for the interactive rendering of a three dimensional world on a user device.

BACKGROUND OF THE INVENTION

In the following, it is to be understood that the terms virtual world, virtual environment, virtual experience and virtual reality can be used interchangeably for the purpose of this invention.

Virtual reality (VR) has undergone substantial development over the last decade. Virtual reality enables a user to experience and interact with a computer-generated, virtual environment, which can be similar or completely different from the real world. A central feature of virtual reality is that a feeling of immersion is evoked in the user, where immersion can be defined as the user's perception of being physically present in the virtual environment. Therefore, VR provides the user with a virtual environment.

The application areas of virtual reality are widely distributed and include, for example, entertainment, gaming, business and education. Due to the wide variety of contexts in which virtual environments are used today, there is an ever-growing demand for the compatibility of these virtual environments with external applications.

In particular, there is an increased need to combine the virtual environment with possibilities for communication with other users, both inside and outside of the virtual environment or to allow the users to perform orders and/or payments.

Furthermore, there exists a need to incorporate further applications into the virtual environment seamlessly. The user may well wish to access or use external applications while still within the virtual world, instead of having to exit the virtual world to do so, as this is detrimental to the feeling of immersion in the virtual environment. In particular, it would be desirable to provide a possibility for the embedding of external websites, communication channels, access of contacts, e-commerce platforms, payment networks and the like.

However, many applications like those named above that are most interesting for the combination with the virtual environment involve the transfer of highly sensitive personal data. Thus, there exists the additional problem of ensuring that third parties cannot easily gain access to such personal information, when the user is navigating the virtual environment. As the use of such virtual environments is becoming ubiquitous, there is an increased demand for a broad variety of user devices that are capable of allowing access to such virtual environments. A user device can be understood to be any computing means connectable to the Internet via a Browser application. Examples of such user devices include personal computers, laptops, tablets, cell phones and video game consoles.

Additionally, in order to provide an immersive experience for the user, it is necessary that the rendering of the virtual world occur at high framerates and with a high resolution, in order not to negatively impact the experience for the user. Currently most of the user devices that are not specifically designed for high-end gaming applications are not able to render detailed such three-dimensional virtual environments. Furthermore, user devices that are capable of such rendering tend to be very expensive and immobile.

SUMMARY OF THE INVENTION

It is therefore one objective of the present invention to provide a solution that allows the smooth presentation of three dimensional and high-resolution (for example, HD or 4K quality) environments on a generic user device. In particular, it is desirable that the rendering of the virtual world can be combined with further applications seamlessly, allowing for a more immersive experience for the user, as well as providing safety against the loss of sensitive information to third parties, allowing the user to freely interact with other users or applications from within the virtual environment, without fearing the loss of sensitive information to third parties. Furthermore, it is the objective of the current invention, to provide a framework for the rendering of virtual environments that is compatible with a wide range of possible user devices.

This problem is solved in particular by a system comprising:
a (portable) user device running a browser application and at least one server configured to
    a. receive control commands from the user device;
    b. render views of a virtual world depending on the control commands as image data; and
    c. transmit a stream of the image data to the user device,
    as well as a software component configured to provide additional information.
According to this system, the browser application is configured to:
    a) detect the occurrence of at least one event related to the virtual world and/or the control commands;
    b) upon detecting the at least one event, sending a request to the software component;
    c) receive additional information from the software component in response to the request;
    d) display the image stream from the server in a first layer and the received additional information and/or graphical and/or textual elements derived from the received additional information in a second (partially transparent) layer, wherein the second layer is displayed overlaying the first layer.

It is an important feature of the present invention that the computational "heavy lifting", i.e. the rendering of the three dimensional environment is performed by the server and then streamed to the user device. The image stream, forming the first layer, and the additional information received by the browser, forming the second layer, are then overlaid only on the user device, specifically in the browser. This does not only enable the user to easily overcome the computational limitations of the user device, but merely requires a compatibility of the user device with the browser, thereby being equally applicable to a wide range of devices.

The outsourcing of the rendering to a server alleviates the long standing problem, that the high-resolution rendering of a three dimensional environment at high frame rates, i.e. 60 frames per second or more, is computationally costly, putting high demands on the capabilities of the hardware on which the rendering process is run. The processing capacity of most user devices is not equipped to handle such computations, thereby severely limiting either the framerate, the resolution or both, when directly running such a rendering process.

Furthermore, the combination of layers in the browser application, wherein a software component provides additional information to be displayed in the second layer, allows for a straightforward embedding of external content and applications into the virtual world. The combination of layers in the browser application further simplifies security issues, as all components inherit the credentials and authorization from a single instance.

It is important to note that overlaying in this context can correspond to any form of combining and/or merging the image data with the additional information in a way that results in the additional information to be perceived as in front of the image data, independent of the actual ordering of the layers. HTML5 offers a straightforward possibility for the implementation of a layered structure according to the invention.

The software component can be located either on a further second server (in particular a web server) or on the server providing the image data. Furthermore, it may be advantageous for the software component to be located externally, for example in the cloud or a different server.

In one embodiment, an event can be defined by a list of conditions. The conditions preferably correspond to parameters or properties of the virtual world or the control commands. An event can be considered to have occurred, when all of the defined conditions are satisfied at the same time.

The additional information provided by the software component may contain textual, graphical or audio information. In some embodiments it may provide Links to call up further applications, or redirect the user to further content.

According to one embodiment of the present invention, the control commands change a first position or a first orientation of a first avatar within the virtual world, or cause the first avatar to perform an action in the virtual world, and the rendered views of the virtual world correspond to the first position, first orientation and/or action of the first avatar.

According to this embodiment, the user can navigate the virtual world and interact with objects therein. An advantage of this embodiment is that the browser application must only process the input of the control commands and transmit them to the server, while the server performs the rendering of the virtual world in accordance with the received commands. Thus, the user can freely interact with the virtual world, without the user device having to bear heavy computational loads. This increases the immersiveness of the virtual environment to the user.

According to a (further) embodiment, the software component stores customization options for the appearance of the virtual world and/or the avatar and is configured to receive a selection of a customization option by the browser, and upon receiving the selection provides information to the server, causing the server to render the avatar and/or virtual world in correspondence to the selection.

An advantageous effect of this embodiment is that the user device and/or browser do not need to store information pertaining to the appearance of the virtual world. This further reduces the demands regarding computational power and memory on the user device.

A customization option is understood to include all options related to the visual representation of the three dimensional world, the avatar or the overlying second layer, such as color, appearance, different skins etc.

In a further embodiment of the invention, the server is connected to a multiplayer component, whereby the multiplayer component provides a second position and a second orientation of at least a second avatar, controlled by a second user device, to the server, and the server renders a representation of the second avatar at the second position with the second orientation within the virtual world. Further, the multiplayer component is configured to ensure that the rendering of the virtual world on the first and second user devices is synchronized.

This embodiment enables multiple users to interact with the same virtual world and with each other within the said world. In particular, the multiplayer component may be adapted to connect to a second server, which is controlled by the second user device. This has the advantageous effect that multiple systems according to the current invention may be interconnected straightforwardly, without burdening the user device with additional workloads.

The multiplayer component is however not limited to the connection of different servers. A connection can also be established between the server controlled by the first user device and a conventional piece of personal hardware, adapted for the rendering of three-dimensional environments, such as VR glasses, game consoles, personal computers etc.

In a (further) embodiment of the present invention, the server itself is adapted to monitor the movement of the first avatar to detect conditions for an event, and to transmit at least one identifier to the user device whenever these conditions are met, and the software component comprises a database, the database storing the additional information associated with each identifier.

Thus, according to one aspect of the invention, the reception of such an identifier by the browser constitutes an event. This may be the case for example, when the avatar enters a certain region in the virtual environment. This indirect detection of events by the browser has the advantage that further work load is directed away from the user device. Furthermore, the provision of the additional information by the software component is in this case reduced to a simple look-up procedure, wherein the received identifier is compared to the stored identifiers and the information in the database pertaining to the received identifier is then transmitted to the browser device.

According to a further aspect of the invention, the conditions for the transmittal of the at least one identifier comprises a proximity of the avatar's position to a target position in the virtual world and/or a proximity of the avatar's orientation to a third orientation in the virtual world.

This enables to straightforwardly formulate conditions for events in the virtual world, based on the location of the avatar. In particular, this enables users not trained in the design of three-dimensional environments to pre-set conditions for events in the three-dimensional world, using for example an application programming interface (API).

Note that the term position is not limited to the strict point of the form (x,y,z) in the three dimensional world, but can also refer to a certain region of the world, such as a room or a particular level or floor or any type of areas or volume, that is e.g. defined by several coordinates. In particular, the third position must not necessarily be fixed, but may for example coincide with the second position of a second avatar or a moving vehicle or any other movable or deformable object.

The conditions for the transmittal of the identifier can also be based on a timer and/or meeting all of a first list of predetermined conditions, based on the first location and/or first orientation and/or the input of control commands and/or an action performed by the first or second avatar.

In this way, various conditions may be combined in the definition of an event. For example, the proximity to a certain third position in the three-dimensional world may only lead to the detection of an event when combined with a certain timer value, or in combination with a certain orientation of the first avatar.

A further embodiment of the system according to the present invention can be achieved, when the additional information received from the software component allows an embedding of external applications into the virtual world.

In this context, the term embedding refers to the displaying of textual, visual or audio information received from a further application running on the user device, and incorporated in the second layer, to be displayed in front of the image stream.

This enables the seamless incorporation of data provided by external applications into the second layer, to be displayed in front of the image stream. In particular, this allows the user to access further applications without needing to exit the virtual world. Additionally, the information provided by the additional software upon the detection of an event may be used to instigate the incorporation of such external applications.

In particular, the additional information provided by the software component and displayed in the second layer may include links that enable the browser application to open further applications. In this case, the embedding of external features in the virtual environment inherits the safety features already provided by the browser application.

In a particular embodiment, the additional information received from the software component establishes a communication channel between the user device and the second user device, in particular a chat function and/or an audio channel and/or a video connection.

Particularly in multiplayer settings this allows for a direct communication between the various users, participating in the three dimensional world. This makes the multiplayer experience more attractive to the user, as the user may communicate or cooperate with other users easily.

In a further embodiment, the browser application is provided with an authorization to instigate and control the running of the external applications on the user device.

As the additional information is displayed within the second layer of the browser application, it is therefore necessary to allow for the browser application to act with the necessary authentication and clearance to instigate and manage the running of further applications on the user device, in accordance with the data received from either the server rendering the virtual world or the software component.

This too aids the immersiveness of the experience for the user, as it is not necessary to manually permit the use of certain applications. This is especially useful for e-commerce applications. In a particular embodiment the browser application may call on established online payment systems as plug-ins, to facilitate easy payment in the virtual environment. Since the browser application does not require a separate permission by the user to instigate pertinent transactions, again the relevant safety features are bequeathed to the virtual environment. This greatly simplifies and expedites use of external applications while in the virtual world.

According to a further aspect of the invention, the software component consists of a content management system (CMS), and the customization options can be set through an Application Programming Interface (API).

This further increases the user friendliness, when it comes to the customization of the CMS, as it allows non-expert users to manipulate the customization options with greater ease. In a particular example, the CMS is a web application comprised of a web server and a database backend.

In this case, the CMS creates and maintains the virtual environment, by saving a generated configuration for every user device in the database backend. According to this embodiment, the CMS application controls the virtual environment.

Further, the aforementioned problems are solved by a method wherein a (portable) user device running a browser application establishes a first connection to at least one server, the server receives control commands from the user device and renders views of a virtual world depending on the said control commands as image data, transmitting a stream of the image and/or audio data to the user device;

the browser detects the occurrence of at least one event related to the virtual world and/or the control commands and upon detecting the at least one event sends a request to a software component, in response to the request the browser receives additional information from the software component;

the browser displays the image stream from the server in a first layer and the received additional information and/or graphical and/or textual elements derived from the received additional information in a second (partially transparent) layer, wherein the second layer is displayed overlaying the first layer.

According to yet another aspect, the layering structure of the invention may be amended in a third party application, preferably a third party web page, preferably hosted on a third party server. This can be achieved by integrating the first and second layers into a parent frame, which can be part of the third party application or website. In this case, the webpage rendered by the browser application can split into two or more frames, one of which is displaying the virtual world with the first and second layers respectively, which may be referred to as the VR-Frame. At least one of the other frames can display content stemming from the third party server and/or any other server, and can hence be referred to as third-party-frame. The content rendered in the at least one other frame can be that of a web shop or more generic of a merchant platform.

The above referenced frames can be implemented by any technology available, e.g. iframes and/or templates and/or sections of HTML5.

In one aspect of the invention, there is a communication between the at least one of the layers (first and second layer of the virtual word) and the third party application, e.g. the third party webpage are established. Specifically, events that are associated with the first and/or second layer can be passed on to the third party application and/or the third party server. Preferably, the communication is established on the client side e.g. between the frame and optionally passed on to a server, e.g., the third party server. This enables to generate an immediate response to the event, e.g. by the third party web page/side.

Once the browser application detects an event, a request is sent to the software component, which returns additional information, which is then displayed in the second layer. In particular, the additional information may include a link or button, with which the user may interact with the control commands.

Once the browser application registers the ID associated with an event in the first and/or second layer, the parent frame may further be instigated to pass on information associated with the event ID to the at least one other third-party-frame associated with the third party application and/or the third party server. In particular, the event ID may be associated, preferably by means of a transfer table, to an action on the third-party side, such as the placing of an item in a checkout basket. This information may then be further relayed by parent-frame to a component of the third party application. Alternatively, the information may only cause a local change in the third-party-frame of the browser/client, which can be flashed to the third party application or server at a later time.

The term "parent frame" is chosen to underline the conceptual structure of the present aspect of the invention and may not refer to an actual frame, but rather more generally to the component of a third party application or webpage, into which the VR-frame and one or more third-party frames are embedded.

In an alternative aspect, the browser may pass the additional information on to the third party application and/or third party server immediately upon the detection of the event, without relaying it to the third-party-frame previously.

In all of the above cases, the relaying of the information associated to the event ID may or may not be conditional on the user entering respective control commands, once the graphical representation is shown in the second layer. Thus, for example, the user may have to click on a button in the second layer, before the passing on of associated information is instigated by the parent frame. Alternatively, for certain event IDs, it may be preferential to immediately instigate the passing on of the associated information by the parent frame, without requiring further input by the user.

This aspect is particularly suited, for instance, to ecommerce applications. Here, the event may be triggered by some action of the Avatar in the virtual world, which prompts the displaying of additional information on the second layer. Such additional information may, for example, include product information, as well as a purchasing button, which may instigate the purchase of the displayed item. When the user enters a corresponding control command (such as clicking on the purchasing button), associated information can be relayed in the manners described above.

This allows, for example, to place items, which are on sale on the third party website, to be placed in a checkout basket, through actions in the virtual world. The separation of the first and second layers and the third-party webpage respectively into different frames enables parts of the third party webpage to remain accessible and visible directly to the user while navigating the virtual world.

With the method according to the invention, the same advantages can be achieved as have already been described in connection with the system according to the invention. It should be noted that the features described in the context of the system according to the invention apply to the method according to the invention. Likewise, features of the method according to the invention are transferable to the system according to the invention by configuring the browser application, server or additional software in such a way that it is suitable for carrying out the corresponding method features.

BRIEF DESCRIPTION OF THE DRAWINGS

In the following, the invention is also described with respect to further details, features and advantages, which are explained in more detail with reference to the figures. The described features and combinations of features, as shown below in the figures described with reference to the figures, are applicable not only in the combination indicated in each case, but also in other combinations or on their own, without thereby leaving the scope of the invention.

In the following, embodiments of the invention are described with respect to the figures, wherein

FIG. 5a shows an exemplary database entry for the definition of an event;

FIG. 5b shows an exemplary database entry linking the ID of events to the additional information;

FIG. 6 shows an example of a user device according to the system of the invention;

DETAILED DESCRIPTION

Figure 1:
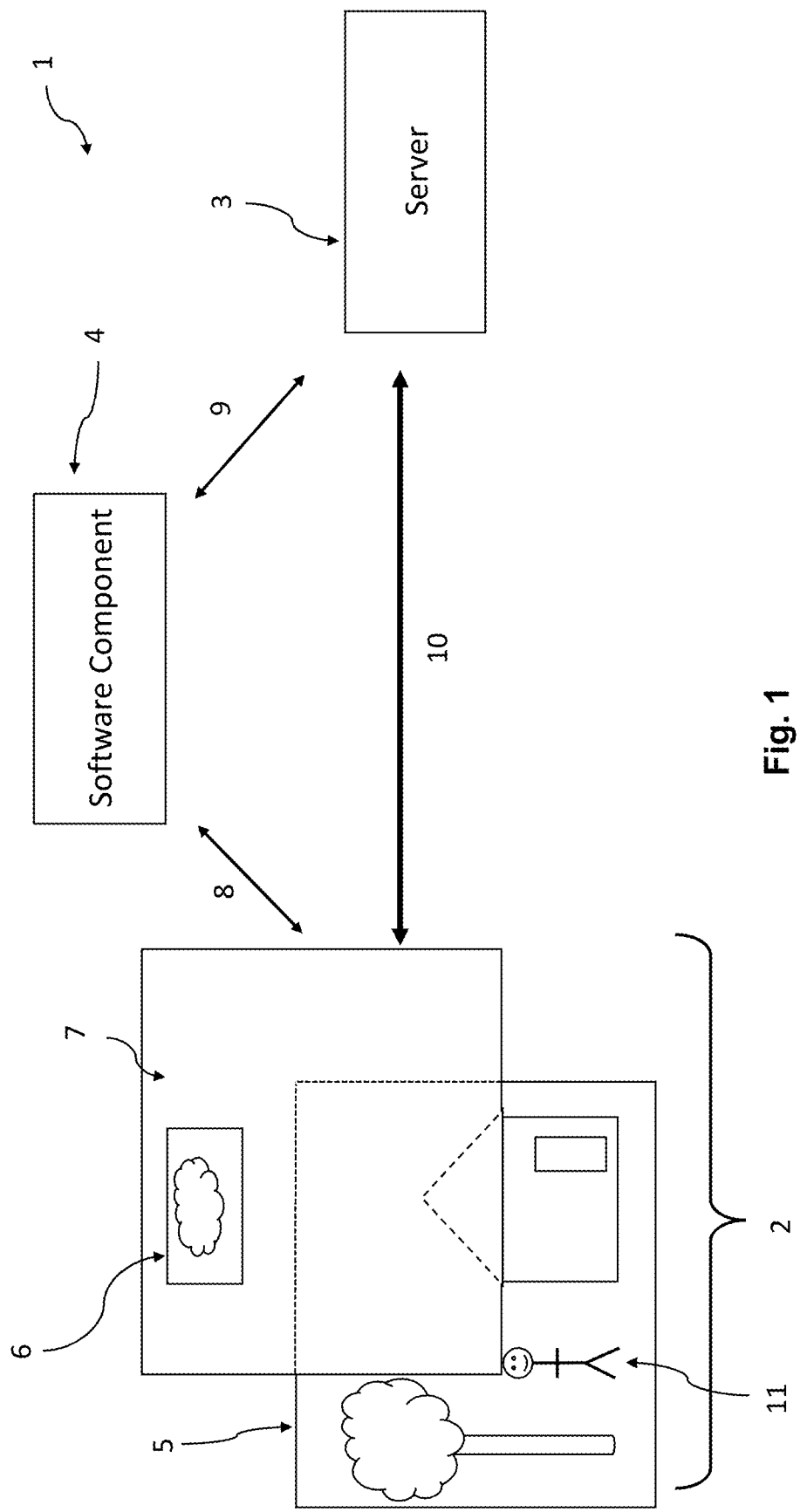
FIG. 1 shows a system consisting of a browser application running on a user device (not shown), a software component and a server.

FIG. 1 illustrates the basic setup of a system according to the present invention. When entering the virtual world by accessing an environment URL, a representative display provided by browser application 2 on a display of a user device with limited computational capacity (not shown) establishes communication via a first connection 8 to a software component 4, executed on a separate servicer, to run initial authentication checks and to be queued by the software component 4 for access to a Server 3.

Representative authentication checks may include, for example, a login process whereby the browser application 2 transmits a request for a digital token, such as a HTTP POST request, to the software component 4 over the first connection 8. The corresponding received digital token by the browser application 2 enables access to such virtual world by, for example, a queue service for assignment of a server, such the server 3, from a group of servers that enable access to such virtual world. Further, if accessing the virtual world is password protected, the transmitted request may include a valid password, and/or single sign on (SSO) identifiers, if the browser application 2 or user device includes corresponding SSO functionality. It is further for the user device to login with the user's email and password, if an administrator has previously created an account for that email.

The digital token may be a cryptographically-signed JSON Web ("JWT") token in accordance with Internet Engineering Task Force (IETF) RFC 5741, which may be stored as a cookie and/or RAM memory of the user device, or any other suitable type of digital token. Once the user device has the digital token, subsequent queries from the browser application 2 may result in an authentication check by the software component 4 to determine if the user device has a valid token, i.e., unexpired to access the virtual world.

It should be readily understood that typical cloud streaming servers may not be immediately available for provisioning by the user device, especially if demand is high for such servers, so there may be a delay in being assigned and granted access to a cloud streaming server, such as server 3. If cloud streaming capacity running the desired virtual world (/binary executable) is already provisioned and available, the user device may promptly be redirected to the server 3. If not, the user device may receive a "ticket" along with the ticket's position in the queue, and periodically queries the queue with this ticket. Advantageously, the queue managing software often favor servers located close to the user device to reduce any latency the user device may experience.

The software component 4 establishes a second connection 9 with the server 3. Alternatively, the server 3 connects to the software component 4 to signal its presence and status. In particular, the software component 4 can be further configured to select one out of a plurality of accessible servers according to predetermined criteria, while the browser application 2 is queued. These criteria may, for example, depend on the geolocation or IP address of the user, the connection, the number of available servers or the authentication details. Via the second connection 9 the server 3 downloads a list of the event conditions (see FIG. 5a) from the software component 4 and stores them in an in-memory map of addresses, i.e., hash map or database on the server. The browser application 2 also receives a copy of a partial or full list of the event conditions information.

The server is reserved for a pre-set amount of time, for example 10 seconds, for the user device and the server address (a URL) is sent to such user device for use by the browser application 2. The browser application 2 then connects and authenticates to this server 3, for instance using a WebSocket protocol connection. Over this WebSocket, a negotiation process immediately begins and standard WebRTC ICE (Interactive Connectivity Establishment) candidates are exchanged. ICE candidates are used to establish a third connection 10, for example a WebRTC connection, between the Server 3 and the browser application 2. According to a further aspect of this invention, TURN (Traversal Using Relay around NAT protocol) standard relay servers might be used. After a handshake between the browser application 2 and the server 3 the stream of image data and audio starts.

Over the third connection 10 the image (video) and/or audio data corresponding to the three dimensional environment are transferred from the server 3 to the browser application 2, where it is displayed in the first layer 5.

Over the same third connection 10, the control commands from the browser application 2 are sent to the server 3. Depending on the type of user device used to access the three dimensional environment, the control commands may include: click events, mouse movements, keyboard entries, joystick movements, VR haptics, touchscreen responses, accelerometer inputs, gyroscope measurements, webcam data and spoken commands, i.e. microphone input.

Furthermore, the third connection 10 comprises a bidirectional data channel for the exchange of further information between the server 3 and the browser application 2.

When the browser application disconnects from the server 3, the server 3 updates its status to the software component 4 via the second connection 9 to declare itself available again.

When an event is detected by the browser application 2, the browser application sends a request (depending on the availability of the required data in the browser application) to the software component 4 via the first connection 8 and receives additional information pertaining to the event from the software component 4 via the same connection. The browser application 2 then displays the received additional information and/or graphical and/or textual elements derived from the received additional information 6 in the second (partially-transparent) layer 7, wherein the second layer 7 is displayed overlaying the first layer 5. As used herein, "partially-transparent layer" means without limitation, semitransparent or transparent regions over at least a portion of such layer, with at least other portions of the layer having images that block-out or merge with images present in the overlaid, i.e., under-layer, such as first layer 5. Alternatively, the browser application may have downloaded all of the additional information necessary to execute the event beforehand from the software component 4. FIGS. 8A to 8E, described below, depict representative configurator and rendered display screens for associating and storing in the software component 4 exemplary images for the display of pop-up images when the occurrence of an associated triggering event is detected. Likewise FIGS. 9A to 9D depict representative configurator and display screens for associating and storing in the software component exemplary videos for the display of videos when the occurrence of an associated triggering event is detected.

When the server 3 receives control commands from the browser application 2 via the third connection 10, the position and orientation of the first avatar 11 in the virtual world is updated, and the image data transferred to the browser application 2 are updated accordingly. Furthermore, the server 3 compares the new position and orientation of the avatar with the list of positions and orientations corresponding to possible event conditions, stored in the second database on the server 3.

Further possible event conditions include the association of an ID of an in-game Actor (element) with a video, scheduled absolute time (i.e. the real world time), time elapsed since the beginning of the stream and others.

Figure 2:
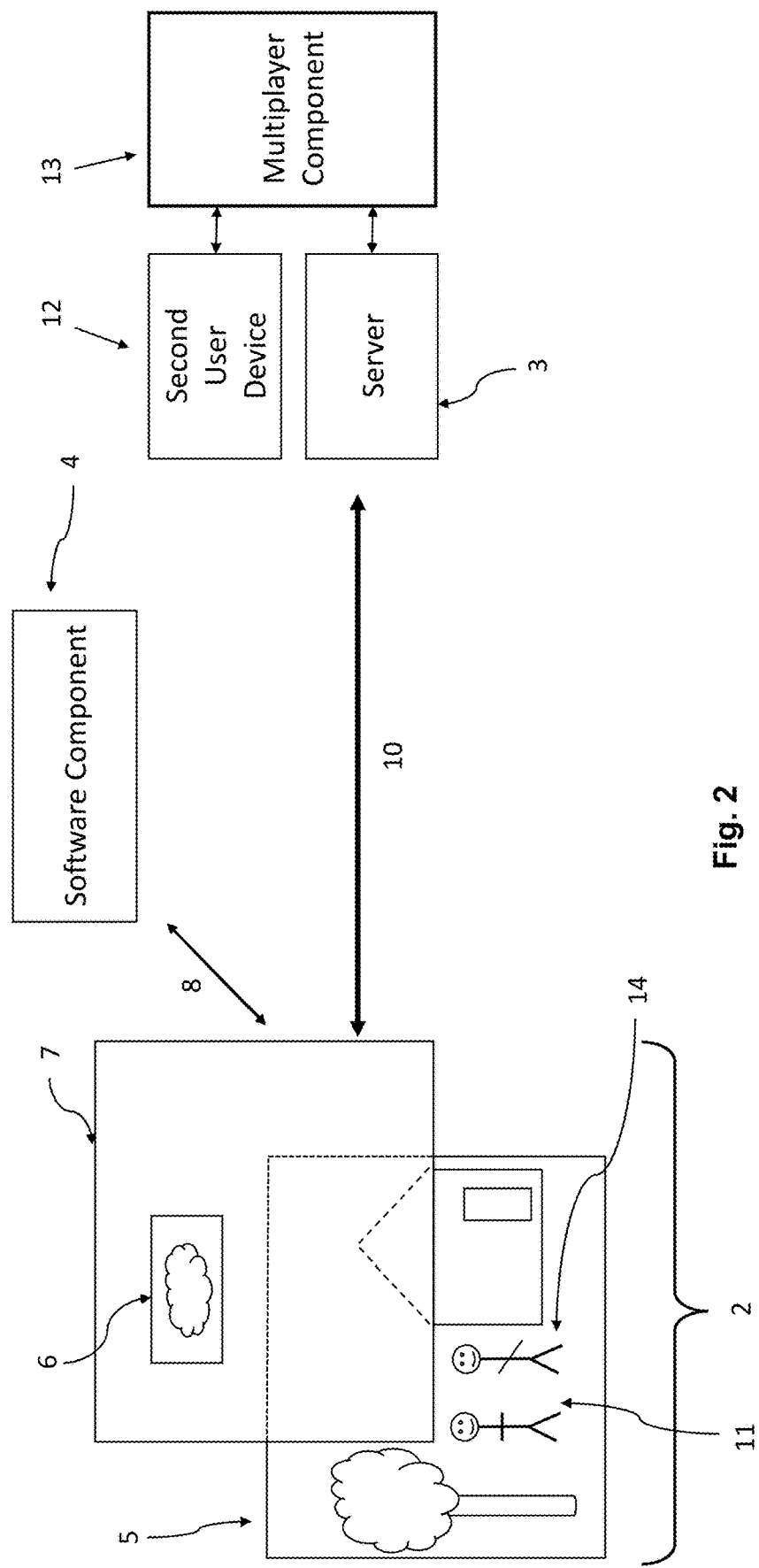
FIG. 2 shows the system according to the invention in a multiplayer setting, connected to a further user device.

FIG. 2 shows the system in a multiplayer setting. The server 3 receives the position and orientation of a second avatar 14 from a multiplayer component 13. The multiplayer component 13 is connected to at least a second user device 12, which controls the movement of a second avatar 14. It is understood that this connection to a second user device may also be an indirect connection via a further server according to the current invention. In this case, the second user device is to be understood as the entire system according to the present invention. Upon receiving the second position and the second orientation, the server 3 renders a second avatar 14 as a part of the image data displayed in the first layer 5.

Figure 3B:
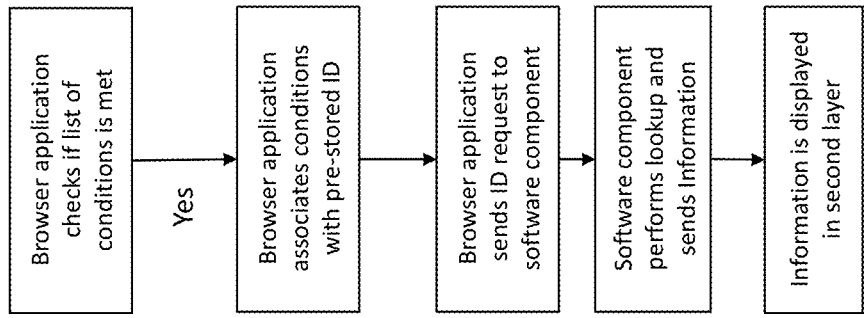
FIG. 3b shows the detection of an event through the browser application.
Figure 3A:
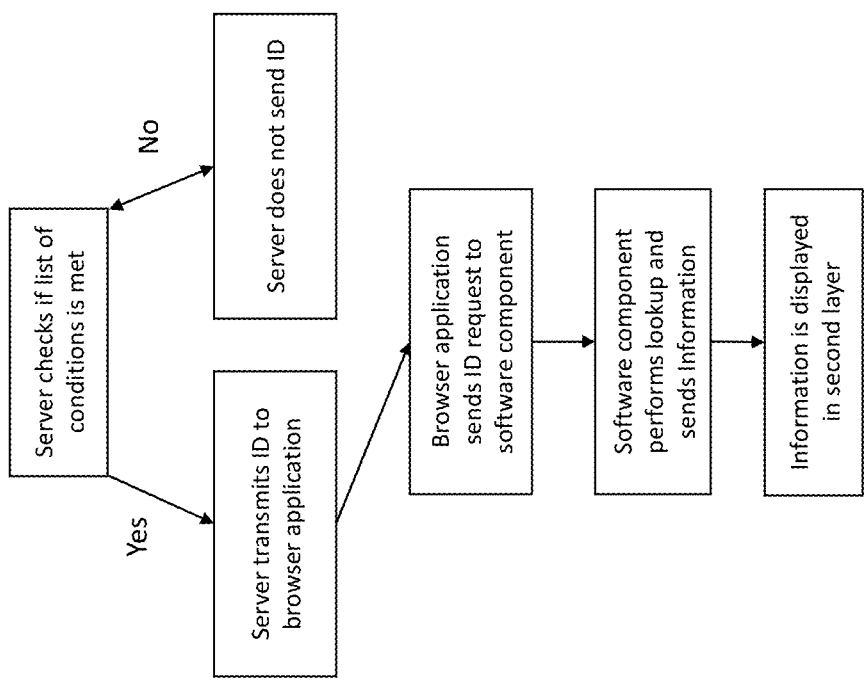
FIG. 3a shows the detection of an event by the transmittal of an ID from the server to the browser application.

FIG. 3a shows the indirect detection of event conditions in the system, through the server 3 of FIGS. 1 and 2. While the first avatar moves in the virtual environment, the server monitors the properties of the input commands and the virtual world and checks whether all conditions for a predefined event are satisfied. If this is the case, the server transmits an ID corresponding to the event that was detected to the browser application. The browser application then detects the presence of the ID in the data stream of the third connection as an event. The browser application then sends a request to the software component, containing the received ID, or has previously already fetched data containing such an ID. The software component then compares the received ID against a list of IDs stored in the database. Once the matching ID in the database is found, the software component transmits the additional information associated with the received ID to the browser application in the event the additional information has not already been pre-fetched. Finally, the browser processes the received additional information and displays it in the second layer, overlaying the image data stream.

FIG. 3b shows the direct recognition of an event condition through the browser application 2 in a further embodiment of the invention. In this case, the browser application 2 monitors the control commands and virtual environment directly. When all the conditions defining an event are met, the browser application sends the ID request corresponding to the pertinent event to the software component 4. The software component 4 then compares the received ID to a list of IDs stored in the database. Once the matching ID in the database is found, the software component transmits the additional information associated with the received ID to the browser application. Finally, the browser processes the received additional information and displays it in the second layer, overlaying the image data stream.

Figure 4:
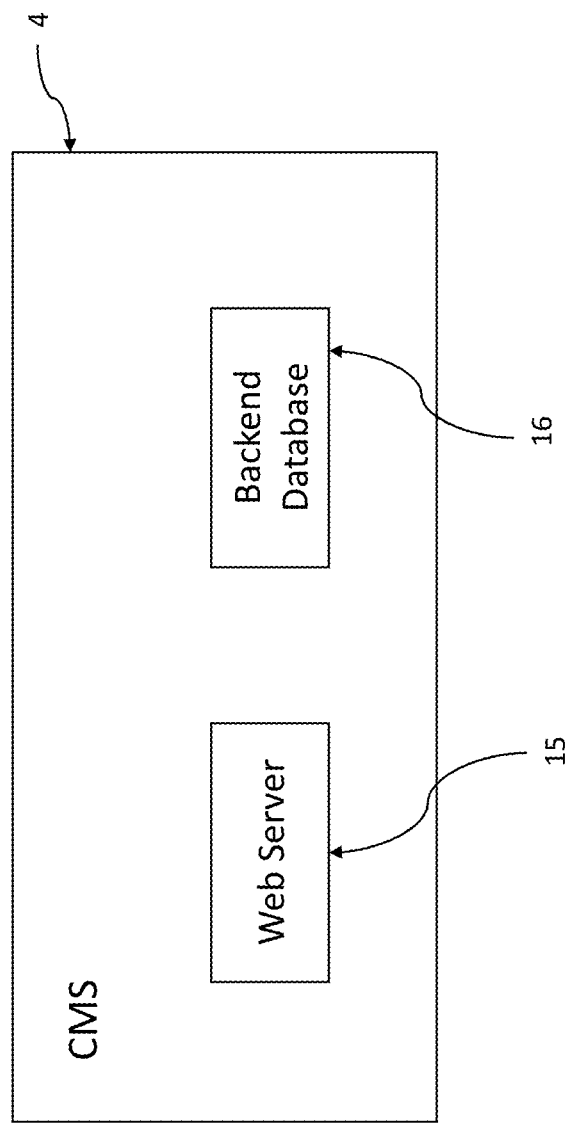
FIG. 4 shows an embodiment wherein the CMS comprises a web server and a backend database.

FIG. 4 shows an embodiment wherein the software component 4 consists of a CMS. The CMS is divided into a web server 15 and a backend database 16. The CMS receives customization options via the first connection 8 and saves the generated configuration to the backend database. In particular, it monitors the status of the virtual environment through the second connection 9.

FIG. 5a shows the data-structure of an event, consisting of the event ID and a plurality of conditions. The conditions are in part based on the possible locations, orientations and actions in the virtual world, as well as the command inputs. For example, a first condition may be that if the first location of the first avatar 11 is within a certain region around a third location in the virtual world. A region may hereby be defined as the set of all points within a predefined distance of the third location, or as a predefined set of points containing the third location (such as for example a room in which the third location is located). A second condition may be for instance the value of a timer equaling a predefined value. In this example, an event will be detected, if the location of the first avatar 11 is within the range of locations defined by the first condition AND the timer value being equal to the predefined value.

FIG. 5b shows the data structure according to which the additional information is stored within the software component. According to this embodiment, the database comprises an ID-list which contains the IDs of all configured events together with the corresponding additional information.

Shown in FIG. 6 is a user device 17 according to one embodiment of the present invention. The browser application 2 is executed by the CPU 19 of the user device, displaying the first layer 5 (not shown) and second layer 6 (not shown) on the display of the user device 20. The control commands are entered through a keyboard 18 of the user device.

Figure 7:
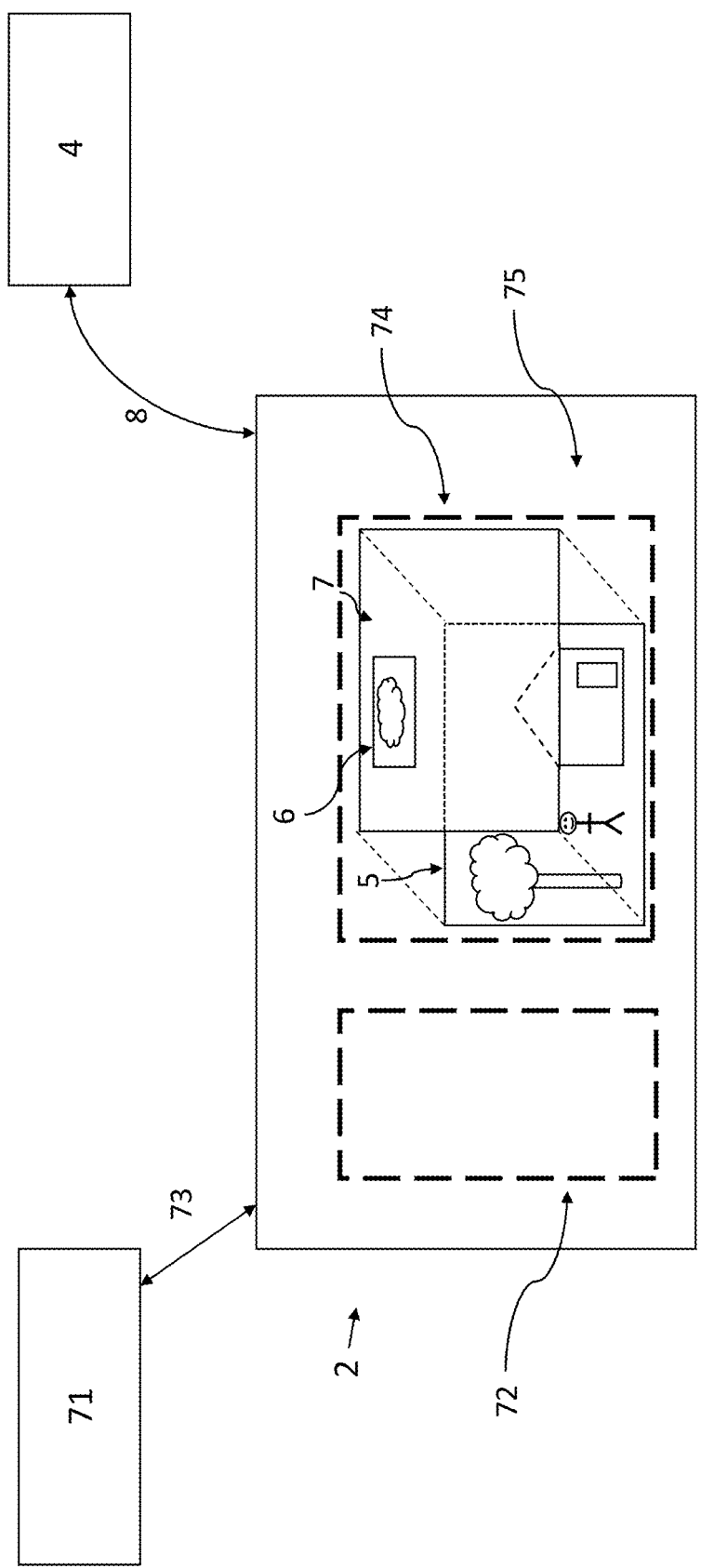
FIG. 7 shows an example of embedding the virtual reality in a client window, establishing communication with a third party server.

Shown in FIG. 7 is a Client, such as a browser application 2 displaying a third party webpage. The webpage is, e.g. using iframes, separated in a third-party frame 72 and a VR frame 74. For ease of reference only, the window/frame holding the third-party frame 72 and the VR frame 74 is referred to as parent frame 75.

In the embodiment, the third-party frame 72 is arranged besides the VR frame 74 which containing at least the first 5 and second 7 layers of the virtual world as already described, e.g. with reference to FIG. 2. In the embodiment of FIG. 7, the displaying of graphical representation of parts of the additional information 6, which was triggered by the occurrence of an event is shown in the second layer 7, can comprise displaying a button, e.g. which allows adding a product to a shopping card. The user may interact with the graphical representation 6, e.g. the button, causing the browser 2 to communicate via the parent frame 75 to the third-party frame 72. In one embodiment, such a communication might cause the third-party webpage to add a particular item to a shopping cart, the particular item being related to what is shown in the VR frame 74, e.g. in the first and/or second layer 5,6.

Alternatively, the browser 2 and/or the parent frame 75 may communicate the received information from the VR frame 74 directly over a fourth connection 73 to an external third-party server 71.

In one embodiment, the communication between the VR frame 74 and the parent frame 75 uses a custom message protocol. This means that the parent frame 75 upon interacting—clicking on the button—with the graphical representation 6 receives a message that identifies an event or preferably an item which is to be added to the shopping cart. The type of graphical representation 6, the time of appearance, the behavior and any id identifying an event or item can be configured in software component 4. The id can be passed as a payload of the custom message to the parent frame 75 allowing the third party webpage to react upon receiving the id by any means available, e.g. triggering further actions within the third party web page.

The custom message can be a JSON string which can be generated and passed as follows:

```
let postMessage = JSON.stringify({
"__ABC__action":"addtobag",
"skuBaseId": "11111",
"INCREMENT":1,
"QTY":1
});
if ('parentIFrame' in window) {
window.parentIFrame.sendMessage(postMessage);
}});
```

The approach allows to easily enable the user to perform actions within the virtual reality which will affect the behavior of the third-party webpage. By distributing the video stream in the first layer 5, the graphical representation 6 in the second layer 7 and by enabling the configuration of the graphical representation 6, in particular the id that will be passed, the invention allows a highly efficient configuration of the system. E.g. it is possible to add the option of shopping for certain items within the virtual reality without having to amend the virtual reality. In one embodiment, the administrator of the system just needs to set up a new graphical representation 6, the respective id and an event which triggers the graphical representation. All of these steps can be taken on the software component 4.

Of course, this part of the invention is not only limited to the shopping of items and/or services. The approach can also be used for trainings and any other educational services.

Figure 8A:
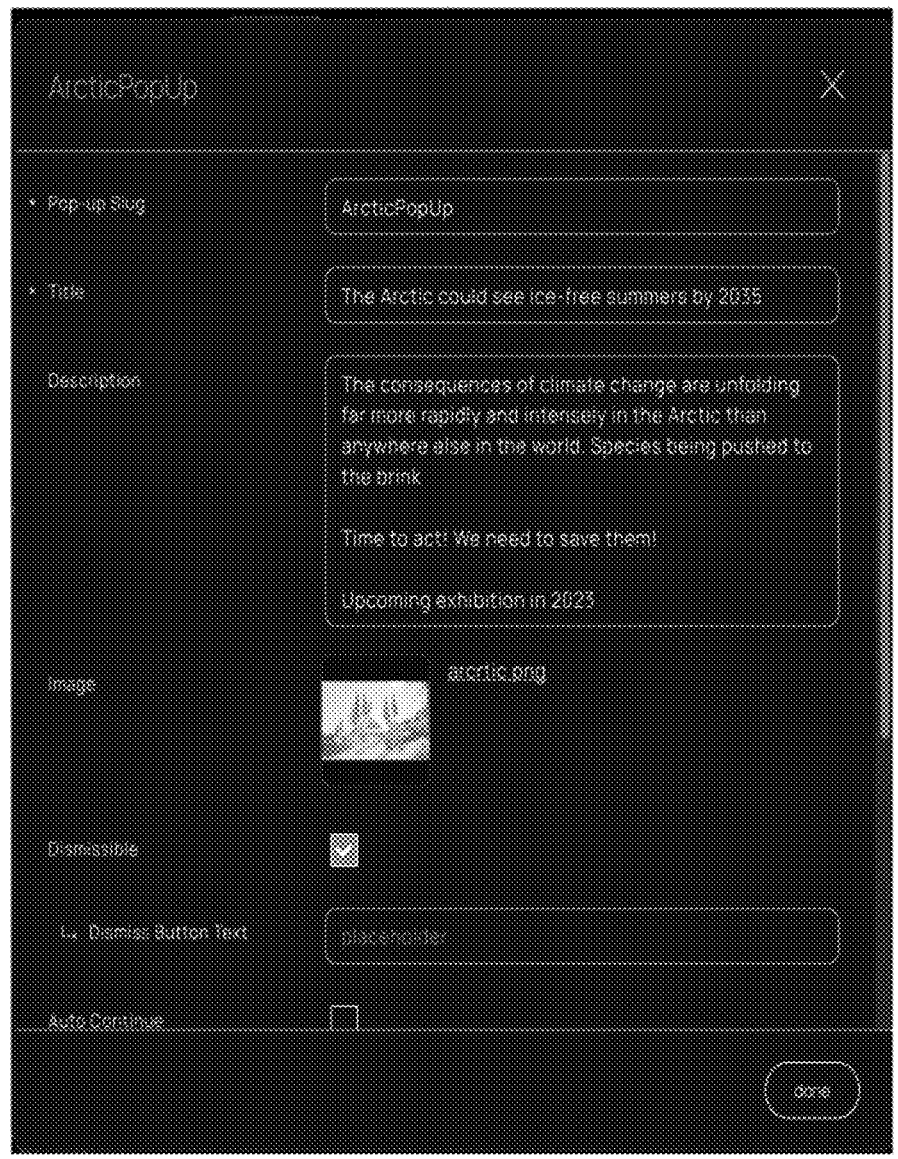
FIGS. 8A to 8E depict representative configurator and rendered display screens for associating and storing in the software component exemplary images according to according to the invention.

In certain embodiments, suitable CMSs useable for the software component 4 of FIG. 4 include, for example, the Unreal Engine computer graphics game development software offered by Epic Games, Inc. Shown in FIGS. 8A to 8E are representative configurator and display screens for associating and storing in such a CMS an exemplary pop-up image to appear in the layer 7 upon the occurrence a corresponding event. FIG. 8A depicts an exemplary pop-up configurator screen for a developer to enter into "Pop-up Slug" and "Title" fields, a name and title, respectively, of the image to be attached via the "image" field. In this example, the Pop-up Slug name of "ArcticPopUp" for the added image of artic scenery. An associated description of the image may also be entered in the "Description" field.

Figure 8B:
Figure 8C:
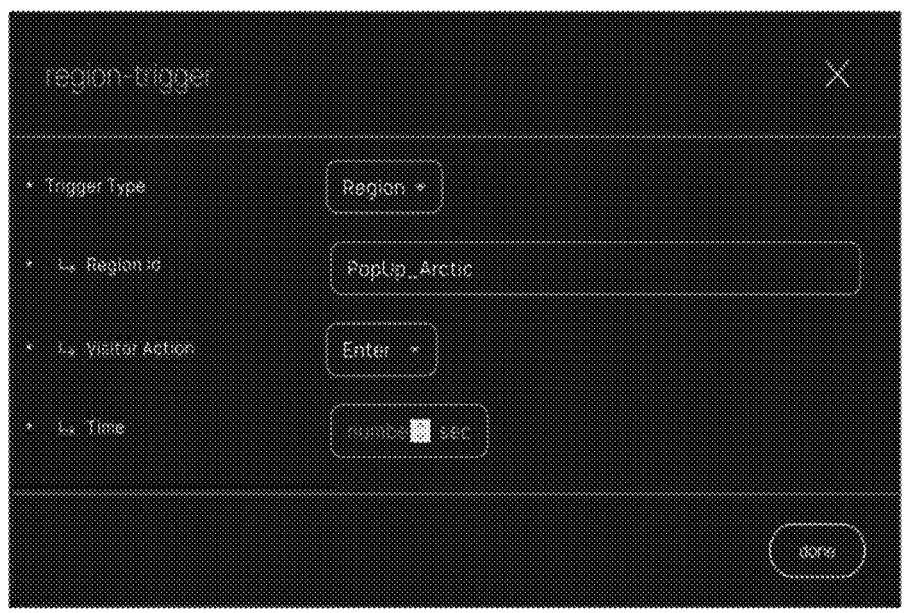
Figure 8D:
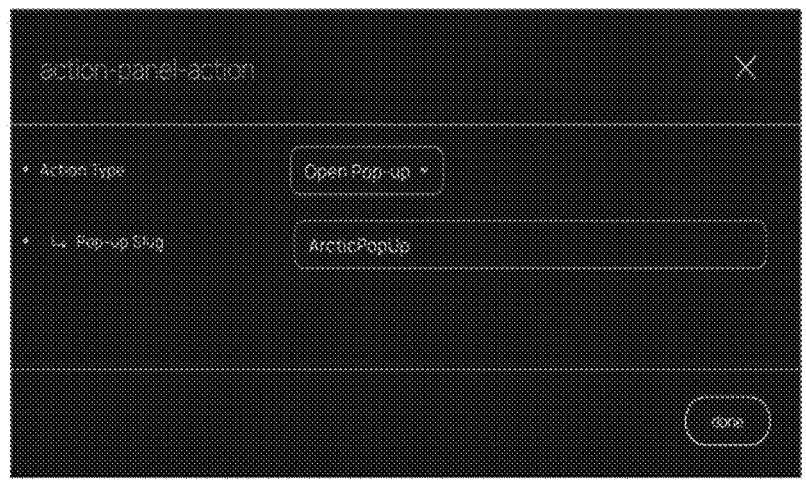
Figure 8E:
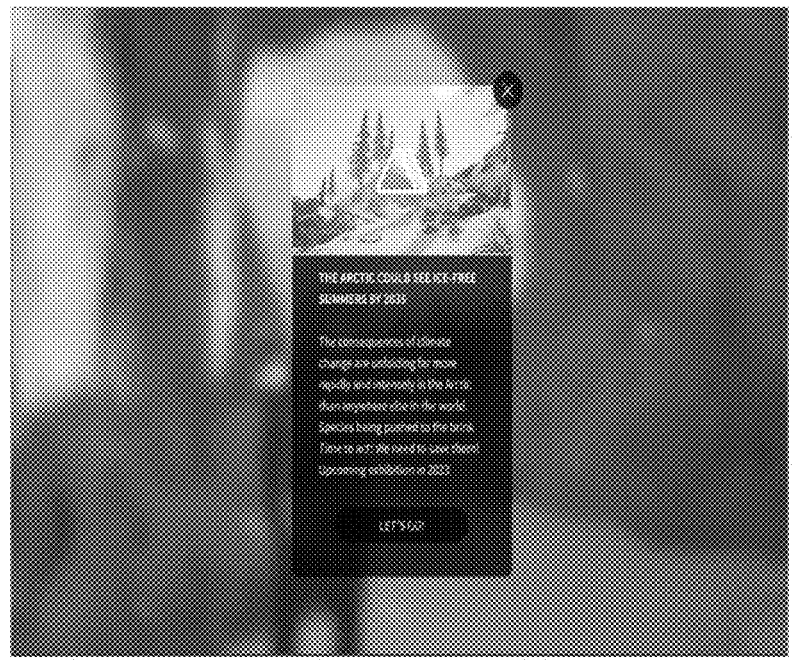

FIG. 8B depicts an exemplary event condition configuration screen for use by the developer to create respective event conditions based on associated "Triggers" and "Actions." FIGS. 8C and 8D depict Trigger and Action sub-configuration screens accessible from the event condition configuration screen shown in FIG. 8B. As shown in FIG. 8C, the "Trigger Type" of "Region" has been selected, and in FIG. 8D depicts the selected "Action Type" for such trigger is "Open Pop-up" with the associated image name of "ArcticPopUp" for the image to be displayed. FIG. 8E illustrates the resulting displayed pop-up image of "ArcticPopUp" and associated description when a user's avatar enters the region for region-triggered event condition.

Figure 9A:
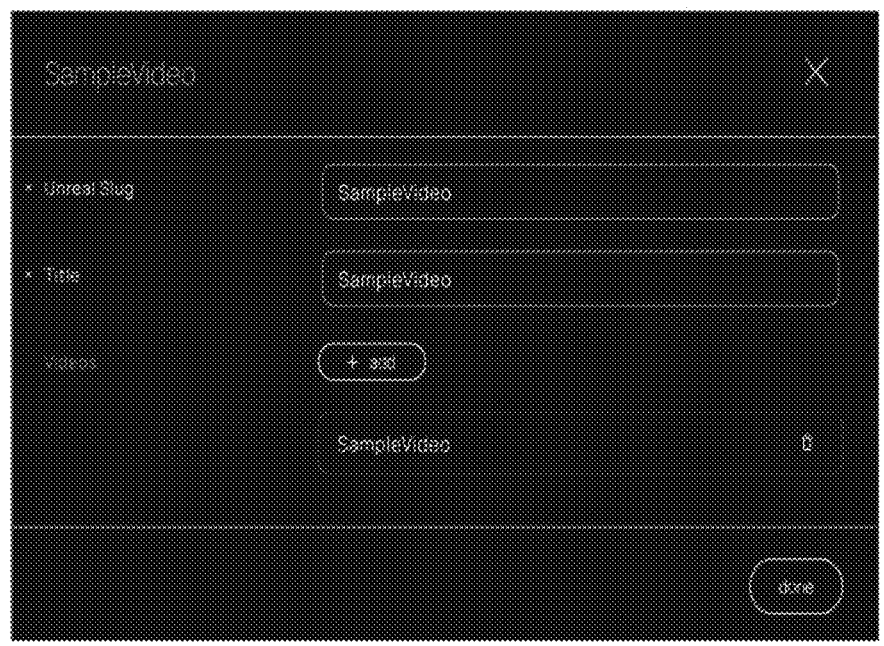
FIGS. 9A to 9D depict representative configurator and rendered display screens for associating and storing in the software component exemplary videos according to according to the invention.

Correspondingly, shown in FIGS. 9A to 9D are representative configurator and display screens for associating and storing in an exemplary CMS 4. a URL of a video to be displayed in the layer 7 upon the occurrence a corresponding event. With reference to FIG. 9A, an exemplary configurator display screen is depicted for entering the name of the video as "Unreal Slug", and a corresponding "Title" of the video, both of which are "SampleVideo" in this example. In addition, configurator display screen of FIG. 9A includes an action button for adding the "videos", which is labeled "+ add." Upon selecting this button, a sub-configurator display screen shown in FIG. 9B would appear to enable the developer to enter the "Title" of the respective video and associated "Video URL" from where the video would be streamed. In addition, this sub-configurator display screen also permits the developer to associate certain attributes of the video to be displayed including whether video is looped, i.e., repeated or whether it is to be live streamed.

Figure 9B:
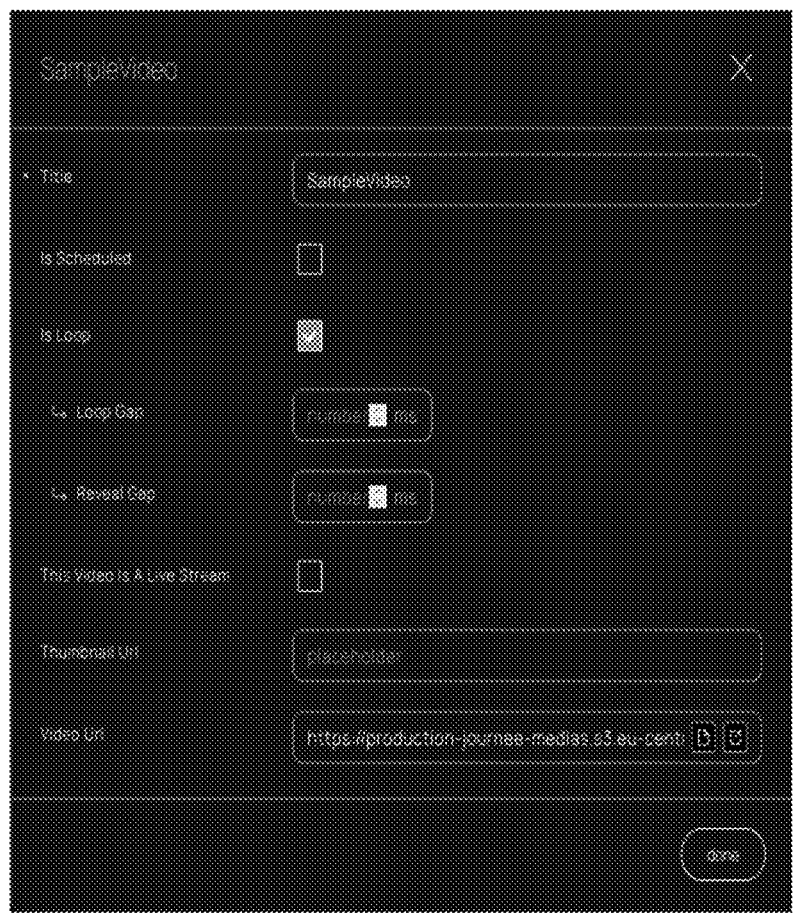
Figure 9C:
Figure 9D:

Another configurator screen (not shown) similar to the configurator screen of FIG. 8B would be used to enter the triggers associated with the playing of videos specified using configurator screens of FIGS. 9A and 9B. See, for example, FIGS. 9C and 9D, which includes triggers the playing of a video when a user's avatar enters a defined region proximate a rendered display screen in the virtual environment displaying in a first display layer the static image "OPERATION #OCEAN DETOX" in FIG. 9C. Upon the avatar entering the defined region, a video will starting playing in the second layer 7 that overlays this static image as depicted in FIG. 9D with the title screen of "THE OCEANS ARE FULL OF TRASH."

The triggers and actions described with regard to FIGS. 8A-8E and 9A-9D are for illustration purposes only, and other alternative triggering events and actions are contemplated by the invention, including without limitation, actions undertaken by the avatar, region triggers, time triggers, specific positions and/or viewpoints of the avatar, and others as described above. Moreover, although these figures were illustrative of triggers and actions based on occurrences in the virtual environment by a user's avatar, it should be readily understood that actions for displaying content in the layer 7 may alternatively be triggered by control commands from the user device.

It will be understood that, while various aspects of the present disclosure have been illustrated and described by way of example, the invention described herein is not limited thereto, but may be otherwise variously embodied as suggested by the disclosure and as indicated within the scope of the following exemplary claims. For instance, despite the disclosure pertaining to a system and method for the rendering of a virtual reality, such a system or method may additionally be implemented in an augmented-reality or holographic system, or the like, in accordance with the previously described invention.

LIST OF REFERENCE SIGNS

1 System
2 Browser application
3 Server
4 Software component
5 First layer
6 Graphical representation of additional Information
7 Second layer
8 First connection
9 Second connection
10 Third connection
11 First avatar
12 Second user device
13 Multiplayer component
14 Second avatar
15 Web server
16 Backend database
17 User device
18 Keyboard
19 CPU of user device
20 Display of user device
71 Third party Server
72 Third-party frame
73 Fourth connection
74 VR frame
75 Parent frame/window

The invention claimed is:

1. Computer-implemented browser application method for rendering images of a virtual environment on a first user device, comprising the steps of:
executing the browser application on the first user device to establish a first connection over a network between the first user device and at least a first server and to receive streaming image data from the first server;
rendering as a first layer on a display of the first user device views of a virtual environment based on the received streaming image data;
transmitting control commands from the first user device to the first server and receiving corresponding updated streaming image data of the virtual environment based on said control commands, wherein the control commands cause the first server to change at least one of a first position or a first orientation of a first avatar within the virtual environment, or the first avatar to perform an action in the virtual environment, and wherein the rendered views of the virtual environment correspond to at least one of the first position, first orientation or action of the first avatar;
upon detecting by the executed browser application, the occurrence of at least one predetermined event related to the virtual environment and/or the control commands, transmitting by the executed browser application, a request with an event identifier over the network to a second server executing a software component, wherein the browser application and the software component maintain corresponding lists of predetermined event identifiers;

receiving additional display information from the software component in response to the request, wherein such additional display information represents content generated external to the rendered virtual environment; and rendering as a second partially-transparent layer on at least a portion of the display of the first user device images derived from the received additional display information, wherein the second layer is displayed overlaying the first layer for enabling display of the external content within the rendered virtual environment;

wherein the first server is adapted to monitor the movement of the first avatar to detect conditions for an event, and to transmit at least one event identifier to the first user device whenever these conditions are met; and wherein the conditions for the transmittal of the at least one identifier are based on a proximity of the first avatar's position to a third position in the virtual environment and/or a proximity of the first avatar's orientation to a third orientation in the virtual environment.

2. The method according to claim 1, wherein the rendered views of the virtual environment correspond to at least one of the first position, first orientation or action of the first avatar.

3. The method according to claim 2, wherein the software component stores customization options for the appearance of at least one of the virtual environment or the first avatar and is configured to receive a selection of a customization option by the browser, and upon receiving the selection provides information to the first server, causing the first server to render at least one of the avatar or virtual environment in correspondence to the selection.

4. The method according to claim 3, wherein the software component comprises a content management system, and the customization options can additionally be set through an Application Programming Interface.

5. The method according to claim 2, wherein the at least one server is connected to a multiplayer component, whereby the multiplayer component provides a second position and a second orientation of at least a second avatar, controlled by a second user device, to the at least one server, and the first server renders a representation of the second avatar at the second position with the second orientation within the virtual environment.

6. The method according to claim 5, wherein the conditions for the transmittal of the event identifier are based on a timer and/or meeting all of a first list of predetermined conditions, based on at least one of the first location, first orientation, the input of control commands, or an action performed by the first or second avatar.

7. The method according to claim 5, wherein the additional display information received from the software component allows an embedding of external applications into the virtual environment.

8. The method according to claim 7, wherein the additional information received from the software component establishes a communication channel between the first user device and the second user device for enabling at least one of a chat function, an audio channel, or a video connection.

9. The method according to claim 8, wherein the browser application is provided with an authorization to instigate and control the running of the external applications on the first user device.

10. The method according to claim 2, wherein the software component comprises a database, the database storing the additional information associated with each event identifier.

11. A system for rendering images of a virtual environment on a first user device comprising:

a first user device having a display, the first user device configured to:
execute a browser application,
receive entered control commands by a user and transmit such control commands over a network to at least one first server, wherein the at least one first server is configured to (i) create image data indicative of rendered views of a virtual environment based, in part, on the received control commands, and (ii) transmit over the network, a stream of the image data to the first user device, wherein the control commands cause the first server to change the stream of the image data to include change of at least one of a first position or a first orientation of a first avatar within the virtual environment, or the first avatar to perform an action in the virtual environment,
receive the stream of image data transmitted to the first user device, and
receive from a second server over the network, additional image information produced by a software component executing on said second server, said additional image information representing content generated external to the rendered virtual environment; and wherein the browser application is configured to:
render as a first layer on the display views of the virtual environment based on the received streaming image data,
detect the occurrence of at least one event related to the virtual environment and/or the control commands,
upon detecting the at least one event, transmitting a request to the second server executing the software component to produce the additional image information, and
render as a second partially-transparent layer on the display images derived from the received additional display information, wherein the second layer is displayed overlaying at least a portion of the first layer for enabling display of the external content in the rendered virtual environment;

wherein the at least one first server is adapted to monitor the movement of the first avatar to detect conditions for an event, and to transmit at least one event identifier to the first user device whenever these conditions are met; and wherein the conditions for the transmittal of the at least one identifier are based on a proximity of the first avatar's position to a third position in the virtual environment and/or a proximity of the first avatar's orientation to a third orientation in the virtual environment.

12. A system according to claim 11, wherein the rendered views of the virtual environment correspond to at least one of the first position, first orientation and/or action of the first avatar.

13. A system according to claim 12, wherein the software component stores customization options for the appearance of the virtual environment and/or the first avatar and is configured to receive a selection of a customization option by the browser, and upon receiving the selection provides information to the first server, causing the first server to render the first avatar and/or virtual environment in correspondence to the selection.

14. A system according to claims 13, wherein the software component comprises a content management system, and the customization options can additionally be set through an Application Programming Interface.

15. A system according to claim 12, wherein the at least one server is connected to a multiplayer component, whereby the multiplayer component provides a second position and a second orientation of at least a second avatar, controlled by a second user device, to the at least one server, and the server renders a representation of the second avatar at the second position with the second orientation within the virtual environment.

16. A system according to claim 15, wherein the conditions for the transmittal of the event identifier are based on at least one of a timer or meeting all of a first list of predetermined conditions, based on at least one of the first location, first orientation, the input of control commands, or an action performed by the first or second avatar.

17. A system according to claim 12, wherein the software component comprises a database, the database storing the additional information associated with each event identifier.

18. A system according to claim 11, wherein the additional display information received from the software component allows an embedding of external applications into the virtual environment.

19. A system according to claim 18, wherein the additional display information received from the software component establishes a communication channel between the first user device and a second user device for enabling a chat function, an audio channel, or a video connection.

20. A system according to claim 19, wherein the browser application is provided with an authorization to instigate and control the running of the external applications on the first user device.

* * * * *

UNITED STATES PATENT AND TRADEMARK OFFICE
CERTIFICATE OF CORRECTION

| | | |
|---|---|---|
| PATENT NO. | : 11,995,787 B2 | Page 1 of 1 |
| APPLICATION NO. | : 18/106596 | |
| DATED | : May 28, 2024 | |
| INVENTOR(S) | : Christian Holger Loclair and Thomas Johann Lorenz | |

It is certified that error appears in the above-identified patent and that said Letters Patent is hereby corrected as shown below:

On the Title Page

In item [30], please add foreign application priority data: Irish Patent Application No. S2022/0111, filed on July 6, 2022.

Signed and Sealed this
Twenty-seventh Day of May, 2025

Coke Morgan Stewart
*Acting Director of the United States Patent and Trademark Office*